US010677723B2

(12) United States Patent
Ditterich

(10) Patent No.: US 10,677,723 B2
(45) Date of Patent: Jun. 9, 2020

(54) AGRICULTURAL PRODUCT QUALITY MONITORING

(71) Applicant: Ditterich Agriculture Pty Ltd, Langwarrin, Victoria (AU)

(72) Inventor: Caile Ditterich, Langwarrin (AU)

(73) Assignee: DITTERICH AGRICULTURE PTY LTD, Langwarrin (AU)

( * ) Notice: Subject to any disclaimer, the term of this patent is extended or adjusted under 35 U.S.C. 154(b) by 203 days.

(21) Appl. No.: 15/856,094

(22) Filed: Dec. 28, 2017

(65) Prior Publication Data
US 2018/0120225 A1 May 3, 2018

Related U.S. Application Data

(63) Continuation-in-part of application No. PCT/AU2016/050525, filed on Jun. 22, 2016.

(30) Foreign Application Priority Data

Jul. 2, 2015 (AU) ................................ 2015902606

(51) Int. Cl.
G01N 21/3563 (2014.01)
G06Q 50/02 (2012.01)
(Continued)

(52) U.S. Cl.
CPC ....... *G01N 21/3563* (2013.01); *G01N 21/359* (2013.01); *G01N 21/85* (2013.01);
(Continued)

(58) Field of Classification Search
CPC .. G01N 21/3563; G01N 21/359; G01N 21/85; G06Q 10/06395; G06Q 50/02; G01J 3/02
See application file for complete search history.

(56) References Cited

U.S. PATENT DOCUMENTS 6,507,022 B1    1/2003  Salmond et al.
2004/0015477 A1* 1/2004  Beck .................... A01B 79/005
2006/0074560 A1 4/2006  Dyer et al.

FOREIGN PATENT DOCUMENTS

EP    2168419 A1    3/2010
WO    2014151398 A1    9/2014
WO    2017000022 A1    1/2017

OTHER PUBLICATIONS

International Preliminary Report on Patentability issued in corresponding International Patent Application No. PCT/AU2016/050525 dated Jan. 2, 2018 (8 pages).
(Continued)

*Primary Examiner* — Bryan Bui
(74) *Attorney, Agent, or Firm* — Kilyk & Bowersox, P.L.L.C.

(57) ABSTRACT

A system according for monitoring agricultural product quality, wherein the system includes a client device that receives an indication of the quality data at least partially indicative of an agricultural product quality of an agricultural product load, determines a load identifier indicative of the agricultural product load, determines a location identifier indicative of a storage location of the agricultural product load, generates agricultural product data indicative of the load identifier, the agricultural product quality and the storage location and transfers the agricultural product data to a remote data store via a communications network.

13 Claims, 14 Drawing Sheets

(51) Int. Cl.
G01N 21/85 (2006.01)
G01N 21/359 (2014.01)
G06Q 10/06 (2012.01)
G06Q 10/08 (2012.01)
G01J 3/42 (2006.01)
G06K 19/07 (2006.01)

(52) U.S. Cl.
CPC ... *G01N 21/8507* (2013.01); *G06Q 10/06395* (2013.01); *G06Q 50/02* (2013.01); *G01J 3/42* (2013.01); *G01N 2021/8592* (2013.01); *G01N 2201/061* (2013.01); *G06K 19/0723* (2013.01); *G06Q 10/08* (2013.01)

(56) References Cited

OTHER PUBLICATIONS

International Search Report issued in corresponding International Patent Application No. PCT/AU2016/050525 dated Sep. 7, 2016 (6 pages).

* cited by examiner

AGRICULTURAL PRODUCT QUALITY MONITORING

This application is a continuation-in-part of International Patent Application No. PCT/AU2016/050525, filed Jun. 22, 2016, which claims priority to Australian Patent Application No. 2015902606, filed Jul. 2, 2015.

BACKGROUND OF THE INVENTION

The present invention relates to a sensing device and associated system for monitoring quality of an agricultural product, such as grain.

DESCRIPTION OF THE PRIOR ART

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

It is known to provide systems for monitoring agricultural In U.S. Pat. No. 7,756,719 initial data is acquired on an agricultural product associated with a harvesting time. The acquired initial data is transmitted (e.g., handed off) via an electromagnetic signal or wireless communication to an intermediate data processing system associated with a handler of the agricultural product. Additional data is appended to the acquired initial data received at the intermediate data processing system to form composite data. The composite data is transmitted via an electromagnetic signal or wireless communication to at least one of a receiver and a data processing system for processing or storing the composite data. The composite data is transferred to or made available to a data management system, which may be accessible to one or more users who seek access to at least one of the initial data, the additional data, and the composite data on the agricultural product or a derivative thereof.

Accordingly, in this system data is handed sequentially through a series of systems, thereby allowing product to be tracked as it is transferred. However, this system requires custom devices to be associated with individual vehicles and other handlers, making the system complex to maintain. Additionally, the need to pass data through individual devices limits access to the data.

U.S. Pat. No. 6,559,655 describes a system for analyzing agricultural products on harvesting equipment includes a test chamber and a near infrared spectrometer disposed within a housing capable of being mounted on the harvesting equipment. A source of near infrared radiation is disposed in the housing adjacent the test chamber so as to emit near infrared radiation into the test chamber, and a near infrared detector is disposed in the housing adjacent the test chamber so as to receive near infrared radiation exiting the test chamber. The spectrometer is mounted on vibration damping elements. A computer controls operation of first and second doors for controlling ingress and egress of product samples from the test chamber and can also be used to process signals from the spectrometer.

However, this equipment can only be used in specific circumstances, thereby limiting wider deployment.

SUMMARY OF THE PRESENT INVENTION

In one broad form the present invention seeks to provide a system for monitoring agricultural product quality, the system including a sensing device having: a sensing unit including: a sensing unit housing; a radiation source configured to emit radiation into a sensing region; a sensor that senses radiation emitted from the sensing region; a sensing unit processor coupled to the radiation source and the sensor that: controls the radiation source; receives signals from the sensor indicative of sensed radiation; and, generates sensor data indicative of at least the sensed radiation; a sensing unit output coupled to the sensing unit processor that outputs an indication of the sensor data; and, a processing unit including: a processing unit housing; a processing unit input that receives the indication of the sensor data from the sensing unit output; an electronic processing device that: processes the sensed radiation data; and, generates quality data at least partially indicative of agricultural product quality using the sensed radiation data; and, a processing unit output coupled to the processing device that outputs an indication of the quality data.

Typically the processing unit housing and sensing unit housing include connectors allowing the processing unit and sensing unit to be detachably interconnected.

Typically the connectors include electrical connections for electrically interconnecting the sensing unit output and the processing unit input.

Typically the sensing unit output and the processing unit input are wirelessly connected.

Typically the sensor data is indicative of the radiation emitted by the radiation source.

Typically the sensing unit housing includes spaced apart substantially parallel first and second arms extending from a hub, the sensing region being provided between the arms so that in use the arms are inserted into a body of agricultural product to thereby sense agricultural product positioned therebetween.

Typically each arm includes a window in optical communication with a respective one of the radiation source and the sensor, the windows being positioned in opposition so that radiation emitted from the radiation source is received at the sensor.

Typically the sensing unit housing includes a hollow tubular body having openings at each end allowing agricultural product to flow therethrough, the sensing region being provided within the tube.

Typically the sensing unit housing is coupled to a agricultural product supply tube and a agricultural product outlet emptying into a storage vessel, and wherein the outlet includes an overflow pipe to receive overflow agricultural product from the storage vessel.

Typically the sensing unit includes gates provided proximate each end of the tubular body, the gates being closable to allow agricultural product to be held within the sensing region.

Typically in use one of the gates at least partially supports agricultural product in the tubular body, and wherein the sensing unit includes a weight sensor that senses a weight of agricultural product supported by the gate.

Typically the sensing unit includes windows in optical communication with a respective one of the radiation source and the sensor, the windows being circumferentially spaced in opposition on either side of the tubular body so that radiation emitted from one window is received at the other window.

Typically the radiation source and sensor are at least one of: positioned in a hub and optically coupled to windows via a waveguide; and, positioned adjacent a respective window.

Typically the sensing device includes an identifier sensor adapted to sense machine readable coded data indicative of a location identifier, the location identifier being indicative of a storage location, and wherein the sensing device outputs an indication of the location identifier via the processing device output.

Typically the system includes a client device that: receives the indication of the quality data from the processing unit output; determines a load identifier indicative of a agricultural product load; determines a location identifier indicative of a storage location; generates agricultural product data indicative of: the load identifier; the agricultural product quality; and, the storage location; and, transfers the agricultural product data to a remote data store via a communications network.

Typically the agricultural product data is created during harvesting, and wherein the client device: determines one or more harvesting conditions; and, generates the agricultural product data in accordance with the harvesting conditions.

Typically the harvesting conditions include at least one of: a harvesting location; a harvesting time or date; and, ambient conditions.

Typically the client device determines the harvesting conditions at least in part by communicating with a control system of a harvester.

Typically the system includes a client device that: determines at least one of: a load identifier; and, a location identifier indicative of a storage location; uses the at least one of a load identifier and location identifier to retrieve agricultural product data from the remote data store; and, at least one of: displays a representation of at least part of the agricultural product data; performs at least one interaction in accordance with user input commands.

Typically the at least one interaction includes at least one of: modifying the agricultural product data to change a storage location; combining the agricultural product data associated with multiple loads to reflect blending of the loads; adding sensor data to the agricultural product data, the sensor data being obtained from one or more additional sensors.

Typically the client device: determines a location identifier of a new storage location; and, modifies the agricultural product data by adding the location identifier of the new storage location.

Typically the additional sensors including one or more conditions sensors that sense ambient conditions to which the agricultural product is subject.

Typically the client device determines a location identifier using at least one of: input commands from a user; and, signals received from a location identifier sensor, the location identifier sensor being adapted to sense coded data indicative of the location identifier.

Typically the coded data is at least one of: stored on an RFID tag; and, displayed optical coded data.

Typically the system: creates agricultural product data during harvesting; stores the agricultural product data in a data store accessible via a communications network; and, uses one or more client devices to access the agricultural product data via the communications network, thereby allowing interaction with the agricultural product data as the agricultural product is moved through a supply chain.

Typically agricultural product data is modified in order to reflect a status of the agricultural product throughout the supply chain for auditing purposes.

In another broad form the present invention seeks to provide a system for monitoring agricultural product quality, wherein the system includes a client device that: receives an quality data indicative of agricultural product quality from a sensing device; determines a load identifier indicative of a load agricultural product; determines a location identifier indicative of a storage location; generates agricultural product data indicative of: the load identifier; the agricultural product quality; and, the agricultural product location; and, transfers the agricultural product data to a remote data store via a communications network.

In another broad form the present invention seeks to provide a system for monitoring agricultural product quality, wherein the system includes a client device that: determines at least one of: a load identifier; and, a location identifier indicative of a current storage location; uses the at least one of a load identifier and location identifier to retrieve agricultural product data from a remote data store; and, at least one of: displays a representation of at least part of the agricultural product data; performs at least one interaction in accordance with user input commands.

In another broad form the present invention seeks to provide a sensing device for sensing agricultural product quality, the sensing device including: a sensing unit including: a sensing unit housing defining a sensing region, at least part of a load of agricultural product being positioned within the sensing region to allow sensing of agricultural product quality to be performed; a radiation source that generates radiation, the radiation being emitted into the sensing region; a sensor that senses radiation emitted from the sensing region; a sensing unit processor coupled to the radiation source and the sensor that: controls the radiation source; receives signals from the sensor indicative of sensed radiation; and, generates a sensed radiation data indicative of at least the sensed radiation; a sensing unit output coupled to the sensing unit processor that outputs an indication of the sensed radiation data; and, a processing unit including: a processing unit housing; a processing unit input that receives the indication of the sensed radiation from the sensing unit output; an electronic processing device that: processes the sensed radiation data; and, generates quality data at least partially indicative of agricultural product quality using the sensed radiation data; and, a processing unit output coupled to the processing device that outputs an indication of the quality data.

BRIEF DESCRIPTION OF THE DRAWINGS

An example of the present invention will now be described with reference to the accompanying drawings, in which:

FIG. 3A is a schematic front view of a first specific example of a sensing device for use in monitoring agricultural product quality;

FIG. 3B is a schematic side view of the sensing device of FIG. 3A;

FIG. 3C is a schematic cross sectional view along the line A-A' of FIG. 3B;

FIG. 3D is a schematic front view of the sensing device of FIG. 3A in use;

FIG. 3E is a schematic front view of an alternative housing for the sensing unit of FIG. 3A;

FIG. 3F is a schematic front view of the housing of FIG. 3E in use;

DETAILED DESCRIPTION OF THE PREFERRED EMBODIMENTS

Figure 1:
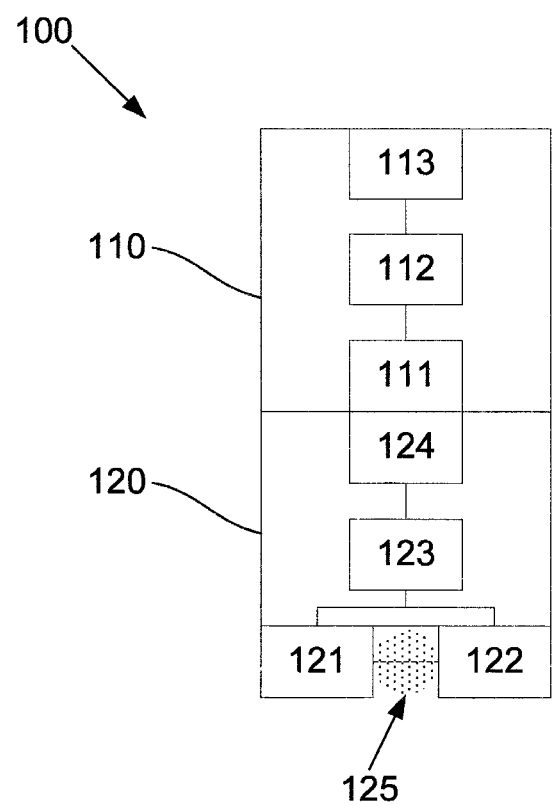
FIG. 1 is a schematic diagram of an example of a sensing device for monitoring agricultural product quality.

An example of a sensing device for use in monitoring agricultural product quality will now be described with reference to FIG. 1.

In this regard, the term agricultural product will be understood to include grain as well as other suitable products, including commodities or resources. For the purpose of illustration the term grain will be used throughout the following description, although it will be appreciated that this is not intended to be limiting, and the terms should be considered as interchangeable. Accordingly, the techniques could apply to other commodities, products or resources, such as crops, crop derivatives, extracts or the like, including but not limited to grain, vegetables, fruit, corn or the like, as well as to chemicals, soil, wool, meat and livestock, poultry, fertilizer, silage, hay, pasture, crops as they are growing, water for example to test for quality, residue chemicals/fertilizers, or the like.

In this example, the sensing device 100 includes a processing unit 110 and a sensing unit 120. The processing unit 110 includes a processing unit housing containing, a processing unit input 111, a processing device 112 and a processing unit output 113. The sensing unit 120 includes a sensing unit housing containing a radiation source 121 and a sensor 122, coupled to a sensing unit processor 123, which is in turn coupled to a sensing unit output 124.

The radiation source 121 is configured to emit electromagnetic radiation, such as near infra-red (IR) or other similar wavelength radiation into a sensing region 125, with the sensor 122 sensing radiation emitted from the sensing region 125, either by transmission through or reflection from the sensing region, thereby allowing agricultural product provided therein to be sensed. The radiation source and sensor can be of any suitable form and can include a laser or other high intensity radiation source, such as an LED, halogen lamps, in conjunction with a CMOS photodiode array, or the like. It will be appreciated that in one example, the configuration is suitable to perform transmission spectroscopy, detecting near IR transmission or reflection spectra of the grain, which in turn can be used to derive information relevant to grain quality, such as levels of relevant protein and/or moisture within the grain, grain weight, or the presence of foreign materials, such as contaminants, chemicals, fertilisers, pesticides, herbicides, gas, or the like.

The sensing unit processor 123 is any suitable form of processing device capable of controlling the radiation source and sensing device, as well as optionally performing preliminary processing of collected data, whist the processing device 112 is a processing device suitable for controlling the sensing unit and performing in analysis of the collected data to determine grain quality. In either case, the processing device can be formed from custom hardware, such as microprocessor, microchip processor, logic gate configuration, firmware optionally associated with implementing logic such as an FPGA (Field Programmable Gate Array), or any other electronic device, system or arrangement, although this is not essential and any suitable arrangement could be used. For example, the processing unit could be formed from a suitably programmed processing system, such as a computing device, portable communications device, such as a smart phone, tablet, or the like.

The processing unit input 111 and sensing unit output 124 are any suitable forms of input and output that allow the sensing unit 120 to provide collected data to the processing unit 110 and could include two way communications channels, provided via either wired or wireless connections. Similarly, the processing unit output 113 is typically adapted to provide onward connectively to a processing system, such as a computer system, or client device, and can therefore include a wireless or wired interface.

Figure 2:
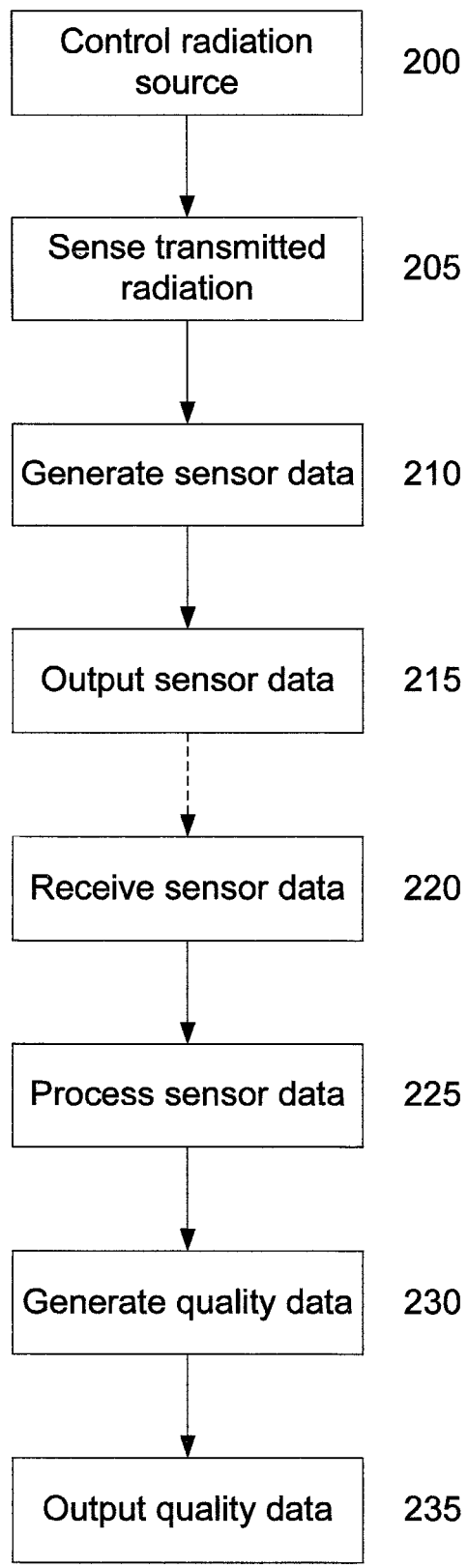
FIG. 2 is a flow chart of an example of a process for monitoring agricultural product quality using the sensing device of FIG. 1.

Operation of the sensing device 100 will now be described with reference to FIG. 2.

In this example, at step 200 the sensing unit processor 123 operates to control the radiation source 121, causing the radiation source 121 to emit radiation into the sensing region 125, with the radiation emitted from the sensing region being sensed by the sensor 122 at step 205. The sensing unit processor 123 receives signals from the sensor 122 indicative of the sensed radiation and generates sensor data at step 210, the sensor data being indicative of a grain transmission or reflection spectra, and optionally also of the radiation emitted by the radiation source. The sensing unit processor 123 may perform preliminary processing of the data, such as filtering, transforming the data, or the like, before the sensor data is then output from the sensing unit 120, via the sensing unit output 124 at step 215.

The sensor data is received by the processing unit input 111 and transferred to the processing device 112, which processes the received sensor data at step 225 and generates quality data at step 230. This is typically achieved by performing a spectrographic analysis of the sensor data, for example by comparing the transmission spectra of the grain to reference spectra defining different types of grain quality, detecting transmission structures or patterns corresponding to the presence, absence or abundance of particular proteins within the grain, or the like. This information is used to generate quality data at step 230, an indication of which can then be output from the processing unit, via the processing unit output 113 at step 235.

The nature of the quality data can vary depending on the preferred implementation, and could be as simple as quantified value indicative of the quality, such as a rating of 1 to 10. Additionally or alternatively, the quality data could include more refined information, such as the level of proteins, or specified proteins, within the grain, which it will be appreciated provides a more comprehensive assessment of grain quality.

Accordingly, it will be appreciated that the above described arrangement provides a sensing device that is able to sense grain quality. In the above arrangement, use of the separate sensing unit and processing unit, allows the sensing unit to perform basic measurement tasks, whilst the processing unit performs more in-depth and comprehensive analysis of the data, thereby effectively distributing processing workload between the sensing and processing unit. This allows minimal processing to be performed in the sensing unit, minimising the hardware requirements of the sensing unit, which in turn maximises the effective use of hardware in the processing unit. This allows the cost and complexity of the sensing unit to be to be minimised, which can have a number of benefits. In particular, the sensing unit can be provided remotely to the processing unit, meaning the sensing unit can be provided in locations that are potentially adverse to equipment, minimising the cost and impact should the sensing unit become damaged by also avoiding damage to the processing unit. Additionally, this allows a single processing unit to be used with multiple sensing units, thereby reducing overheads, whilst maximising the functionality that can be provided. Furthermore, a range of different sensing units can be provided that are customised for specific tasks, whilst allowing these to be used with common processing units, again maximising functionality, whilst minimising cost. The resulting affordability and adaptability of this product allows for the widespread implementation of monitoring and tracking of agricultural products by ensuring all parties in the supply chain have access to what has been prohibitively expensive technology.

A number of features will now be described.

In one example, the processing unit housing and the sensing unit housing include connectors allowing the processing unit and sensing unit to be detachably interconnected, for example using a friction-fit, clip-fit, interference-fit or the like. This facilitates the use of a single processing unit to be used with a number of different sensing units interchangably, depending upon the circumstances of use. For example, this allows a common processing unit to be utilised with different forms of sensing units allowing this to be implemented as a handheld device, in which the processing unit forms part of the handle of an integrated sensing device, or separately as a device mounted on a harvester or the like, as will be described in more detail below.

The connectors can include electrical connections for electrically interconnecting sensing unit output and processing unit output, allowing wired connectivity between the sensing and processing units, which can facilitate data transfer bandwidth between the units. Additionally and/or alternatively, the sensing unit output 124 and the processing unit input 111 can be wirelessly connected, which in one example, allows a single processing unit to be positioned remotely to a sensing unit, for example if the sensing unit is provided in a hazardous environment and/or used in conjunction with multiple sensing units, thereby minimising overall hardware requirements.

Specific example sensing device arrangements will now be described with reference to FIGS. 3A to 3F and FIGS. 4A to 4D.

In the example of FIGS. 3A to 3D, the sensing unit 120 includes a sensing unit housing 320 includes spaced apart substantially parallel first and second arms 321, 322 extending from a hub 323. The sensing region is provided between the arms 321, 322 so that in use the arms can be inserted into a body of grain 360 to thereby sense grain positioned therebetween. In one example, the processing unit 110 has a generally cylindrical housing that generally conforms to the shape of the hub. This provides a number of benefits, such as facilitating connectivity between the processing and sensing unit, providing the appearance of an integral unit, and allowing the processing unit and hub to act as a handle so that that user can more easily hold and manipulate the sensing device. Accordingly, in one example, the sensing device 300 operates as a handheld sensing device that can be inserted into a load of grain 360, thereby allowing grain quality to be easily measured.

Typically, each arm 321, 322 includes a respective window 324, 325 which is in optical communication with a respective one of the radiation source 342 and sensor 343, with the windows being positioned in opposition so that radiation emitted from the radiation source 342 is received at the sensor 343. In use, the radiation source and sensor can be positioned in the hub 325 and optically coupled to the windows via a waveguide, such as a fibre optic cable or the like. Alternatively, the radiation source 342 and sensor 343 can be provided adjacent the respective window.

In this example, the radiation source 342 and sensor 343 are coupled to an electronic sensing unit processor 340, which is in turn coupled to a memory 341 and output 344. The memory 341 will typically store instructions executed by the processor 340 in order to allow sensing to be performed, in a manner similar to that described above.

A separate identifier sensor 345, can also be provided which is adapted to sense machine readable coded data indicative of a location identifier. The location identifier is typically indicative of a storage location, which could include a location where the grain is being statically stored, or where the grain is stored during transport, as will be described in more detail below. Nevertheless, it will be appreciated the term storage location need not necessarily refer to a geographical location, but could include a physical storage vessel, transport vehicle, or the like.

The nature of the identifier sensor 345 will vary depending on the preferred implementation and the nature of the identifier and how this is encoded. For example, in the event that the identifier is encoded on an RFID or other similar tag, the identifier sensor 345 could be an RFID sensor, whereas if the identifier is displayed visually, for example in the form of a barcode, QR code, or the like, the identifier sensor 345 could be an optical sensor such as a laser scanner or the like. In the current example, the sensing unit can output an indication of the location identifier to the processing device, although alternatively the identifier sensor 345 could be provided in the processing unit and/or client device, depending on the preferred implementation and/or the nature of the identifier.

In this example, the processing unit 110 includes a processing device 330 coupled to a memory 331, which can store instructions for operation or the like. A separate input/output device 332, such as a keypad or input buttons and corresponding indicators, such as LEDs or the like, can be provided for controlling the processing device 330, whilst input 334 and output 333 are provided for communication with the sensing unit and a client device, respectively, as will be described in more detail below.

In use, a user can use the input/output device 332 to activate the processing unit 110, causing the processing unit 110 to implement predefined instructions stored in the memory 331, thereby allowing a measurement process to be performed. In particular, this will typically involve having the processing unit 110 instruct the sensing unit 120 to perform a defined measurement process, as outlined above with respect to FIG. 2, thereby providing sensor data to the processing unit 110, which in turn processes the sensor data to determine quality data as previously described. During this process, one or more indications could be provided to the user, such as illuminating one or more LEDs to indicate that the measurement process is underway, and/or is complete.

Figure 3A:
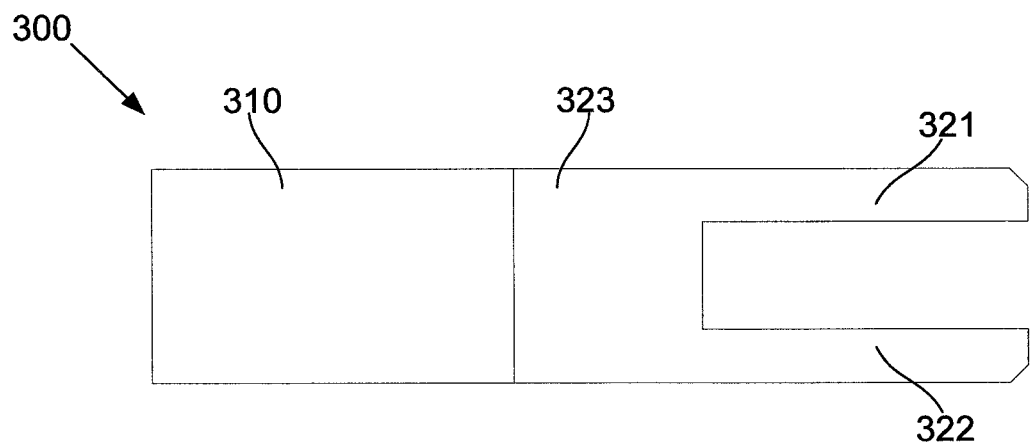
FIGS. 3A-3F are schematic diagrams of an example of a system for monitoring agricultural product quality using the sensing device of FIG. 1.
Figure 3B:
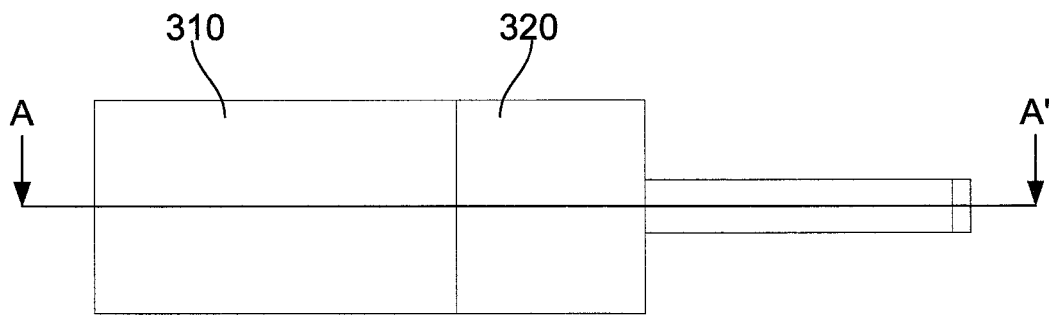
Figure 3C:
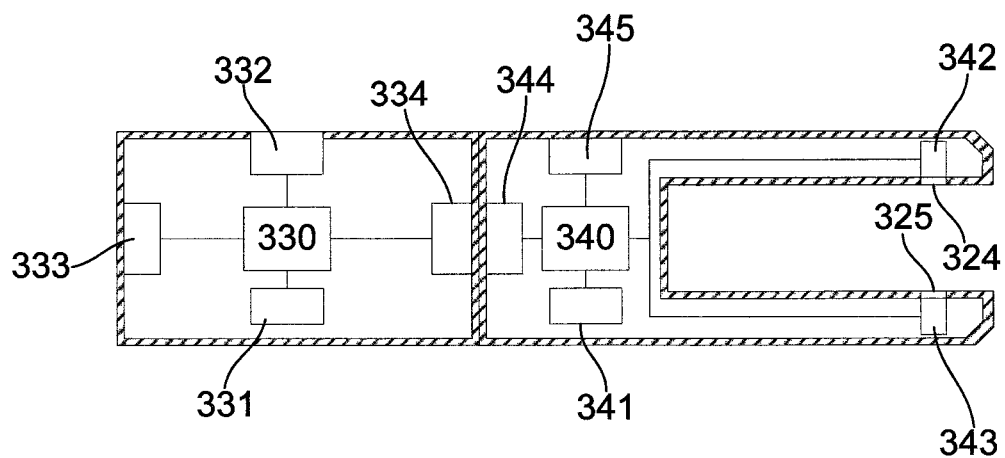
Figure 3D:
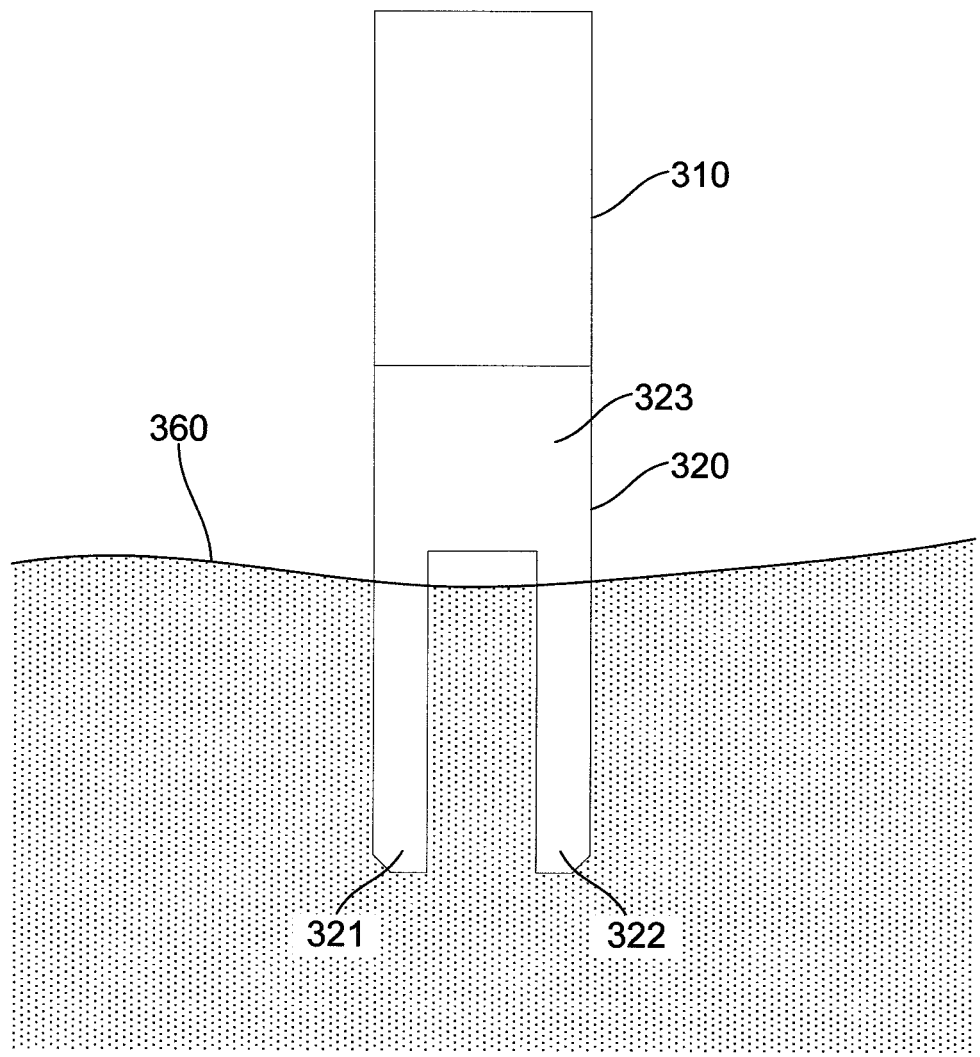
Figure 3E:
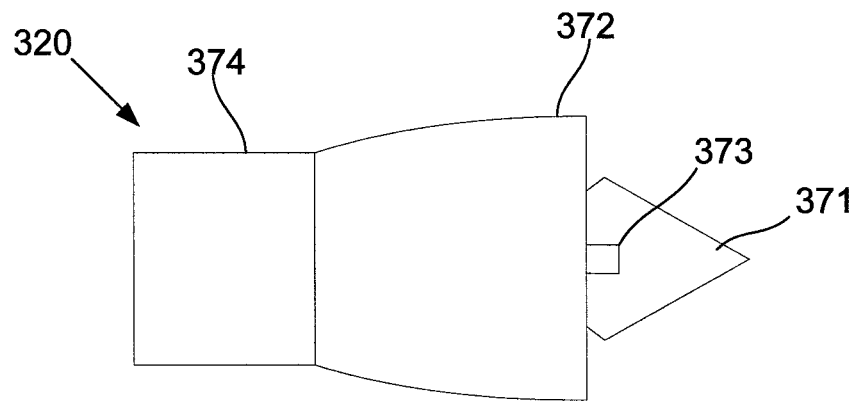
Figure 3F:
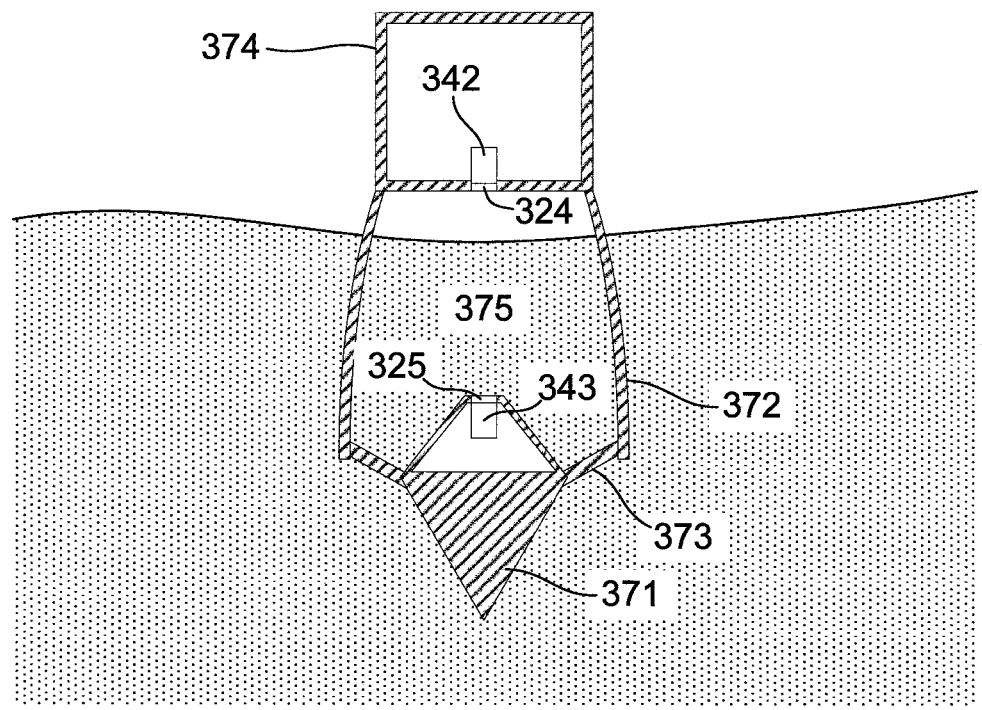

The general concept of a handheld device could be implemented using a variety of configurations of sensing unit housing, and an alternative example is shown in FIGS. 3E and 3F.

In this example, the sensing unit housing 320 includes an end piece 371, coupled to a shroud 372 via arms 373, thereby supporting the end piece 371 away from the shroud 372. The shroud is coupled to a hub 374, to thereby define an open cavity 375 between the end piece 371 and hub 374. In use, a radiation source 343 is provided adjacent a window 325 in the end piece, whilst a sensor 342 is provided adjacent a window 324 in the hub, allowing radiation to be transmitted through the cavity and received by the sensor 342, thereby providing a sensing region in the cavity. This allows the housing to be inserted into a body of grain so that grain accumulates in the open cavity 375, thereby allowing the grain therein to be sensed. It will be appreciated that a range of different housing designs could therefore be used to provide a handheld sensing device.

In an alternative example, a static mounted arrangement could be provided as will now be described with reference to FIGS. 4A to 4D.

In this example, the sensing unit 120 includes a sensing unit housing 420 having a hollow tubular body 421 having openings at each end allowing grain to flow therethrough. In this case, the sensing region is located within the tube, with windows 425, 426 being circumferentially spaced in opposition on the either side of the tubular body 421 so that radiation emitted from one window is received at the other window after passing through the tubular body. It will be appreciated that in one example the hollow body is cylindrical, but this is not essential, and the hollow tubular body could have any cross sectional shape, such as a rectangular shape or the like.

Figure 4A:
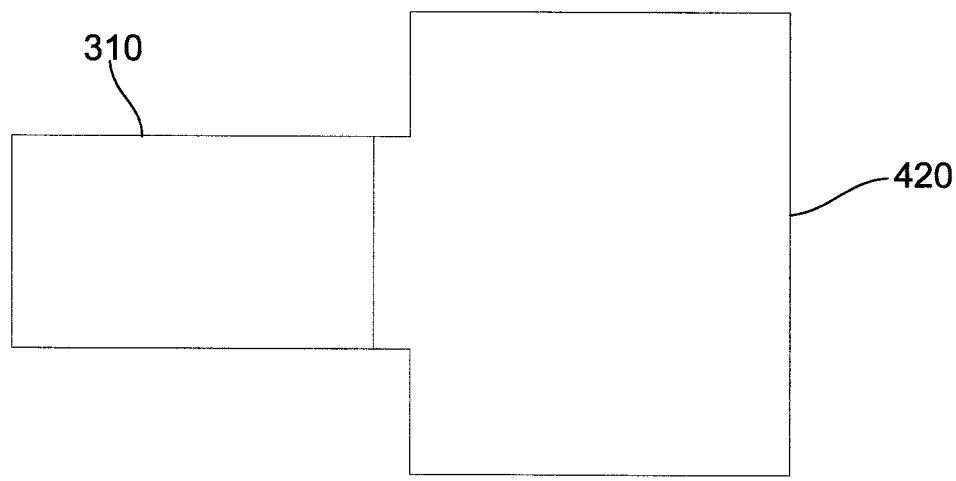
FIG. 4A is a schematic front view of a second specific example of a sensing device for use in monitoring agricultural product quality.
Figure 4B:
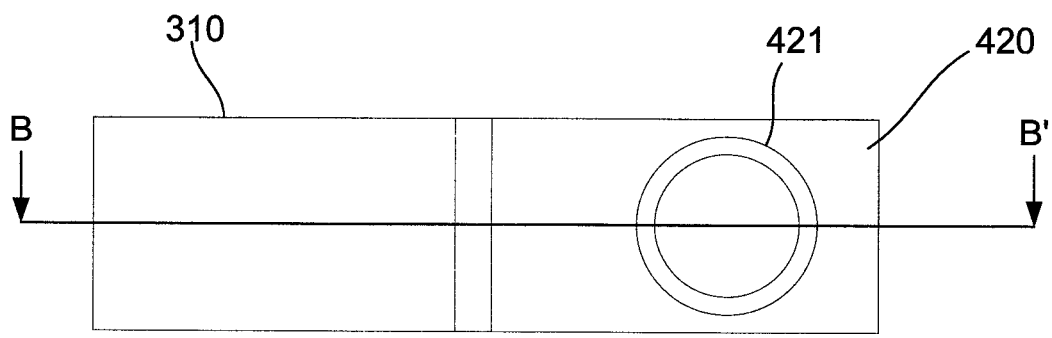
FIG. 4B is a schematic side view of the sensing device of FIG. 4A.
Figure 4C:
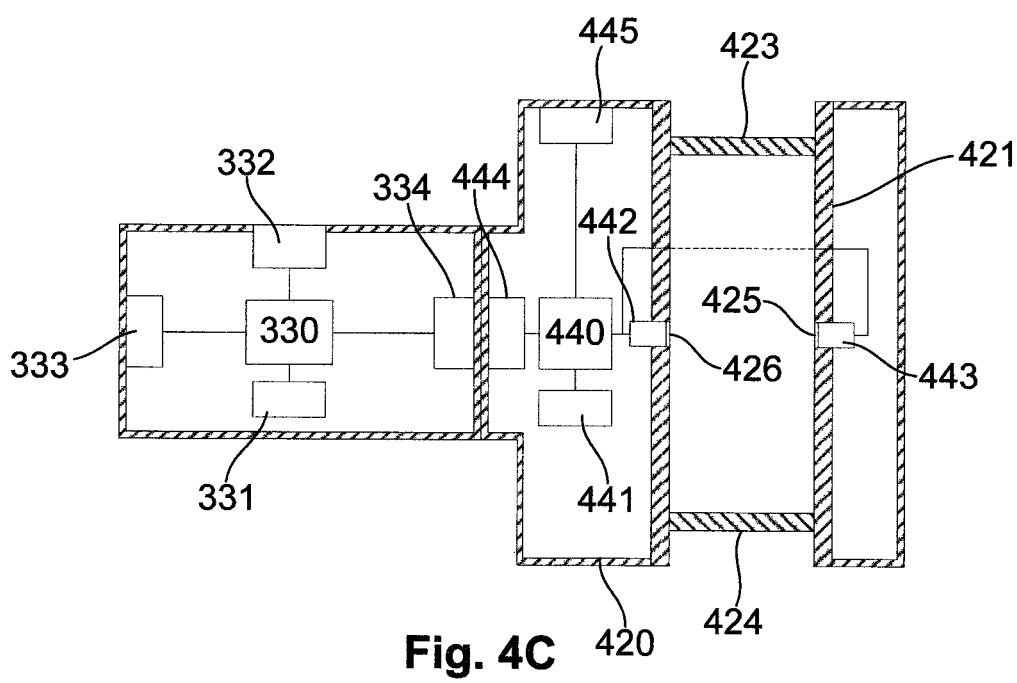
FIG. 4C is a schematic cross sectional view along the line B-B' of FIG. 4B.
Figure 4D:
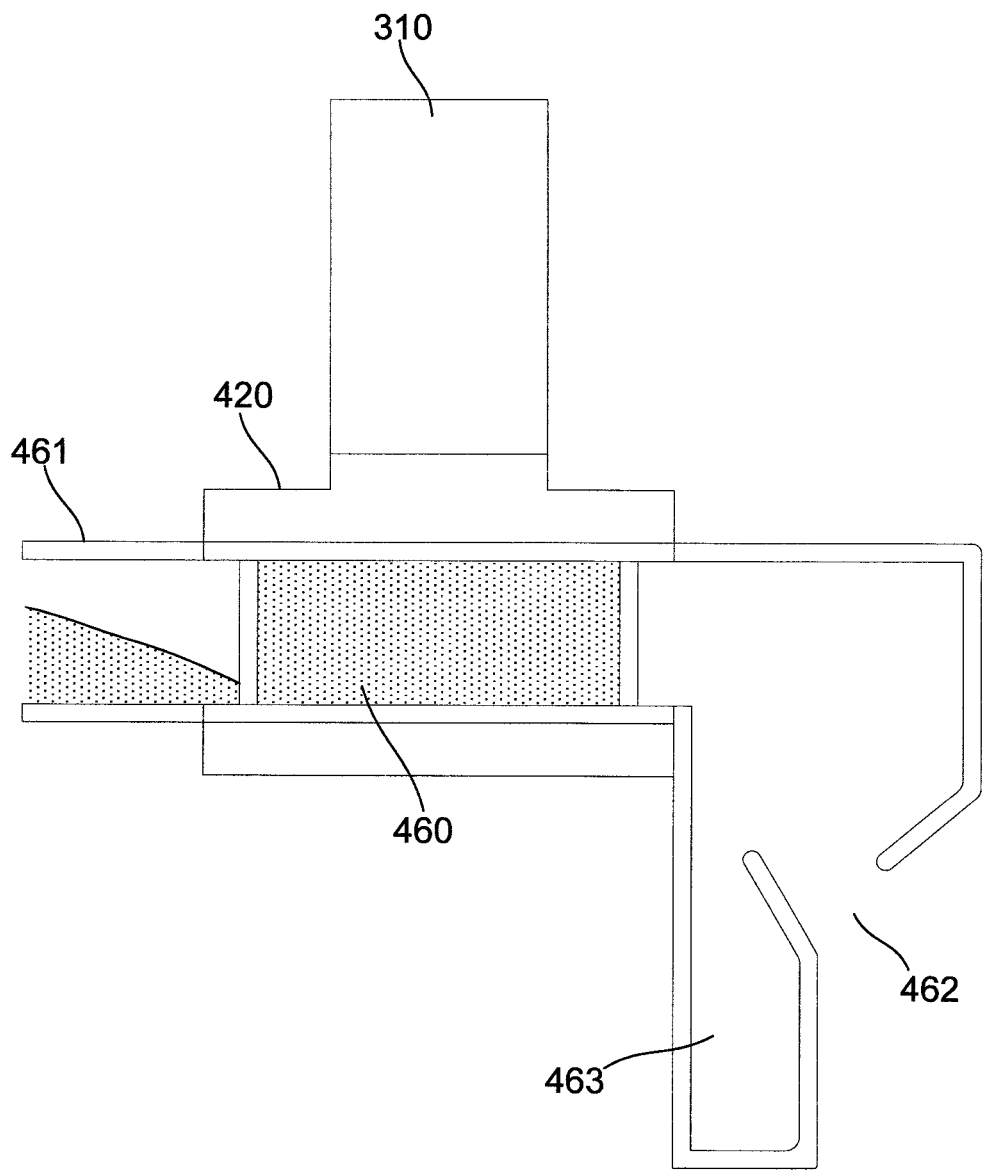
FIG. 4D is a schematic front cutaway view of the sensing device of FIG. 4A in use.

Gates 423, 424 can be provided proximate each end of the tubular body 421, with the gates 423, 424 being closable to allow grain 460 to be held within the sensing region, also shown in FIG. 4D. In this instance, grain 460 can be received from a harvester outlet 461 passing through the tubular body and an outlet 462 into a harvester bin (not shown). In this example, an overflow tube 463 can be provided so as to avoid back pressure on the gate.

Again, a radiation source 442 and sensor 443, can be provided in optical communication with the windows, either via waveguides, or by being positioned adjacent the respective window. The radiation source 442 and sensor 443 are also coupled to an electronic sensing unit processor 440, which is in turn coupled to a memory 441 and output 444. The memory 441 will typically store instructions executed by the processor 340 in order to allow sensing to be performed. A separate identifier sensor 445 such as an RFID sensor, optical sensor or the like can also be provided.

In a further example, the device could be used with the tubular body in a substantially vertical orientation so that one of the gates 423, 424 at least partially supports the grain within the sensing region. The gate 423, 424 could be fitted with a weight sensor, such as a load cell, allowing information regarding the weight of the grain to be determined and added to the grain data.

Accordingly, it will be appreciated that in this example, operation is substantially as in the example described above with respect to FIGS. 3A to 3D. However, in this example, the sensing unit is typically adapted to be mounted to a harvester or other similar arrangement, allowing sensing of grain quality to be performed automatically during a harvesting operation or the like.

It will further be appreciated that a wide range of sensing units could be provided, for example depending on the nature of the product being sensed. Thus, for example, different sensing units could be provided for sensing other crops, chemicals, soil, wool, meat and livestock, poultry, fertilizer, silage, hay, pasture, crops as they are growing, water for example to test for quality, residue chemicals/fertilizers, or the like.

Accordingly, the above described examples provide a hand-held and vehicle mounted arrangements that use a common processing unit 110, which in one example acts as a handle, and in another example can be provided remotely to a vehicle mounted sensing unit 120.

Figure 5:
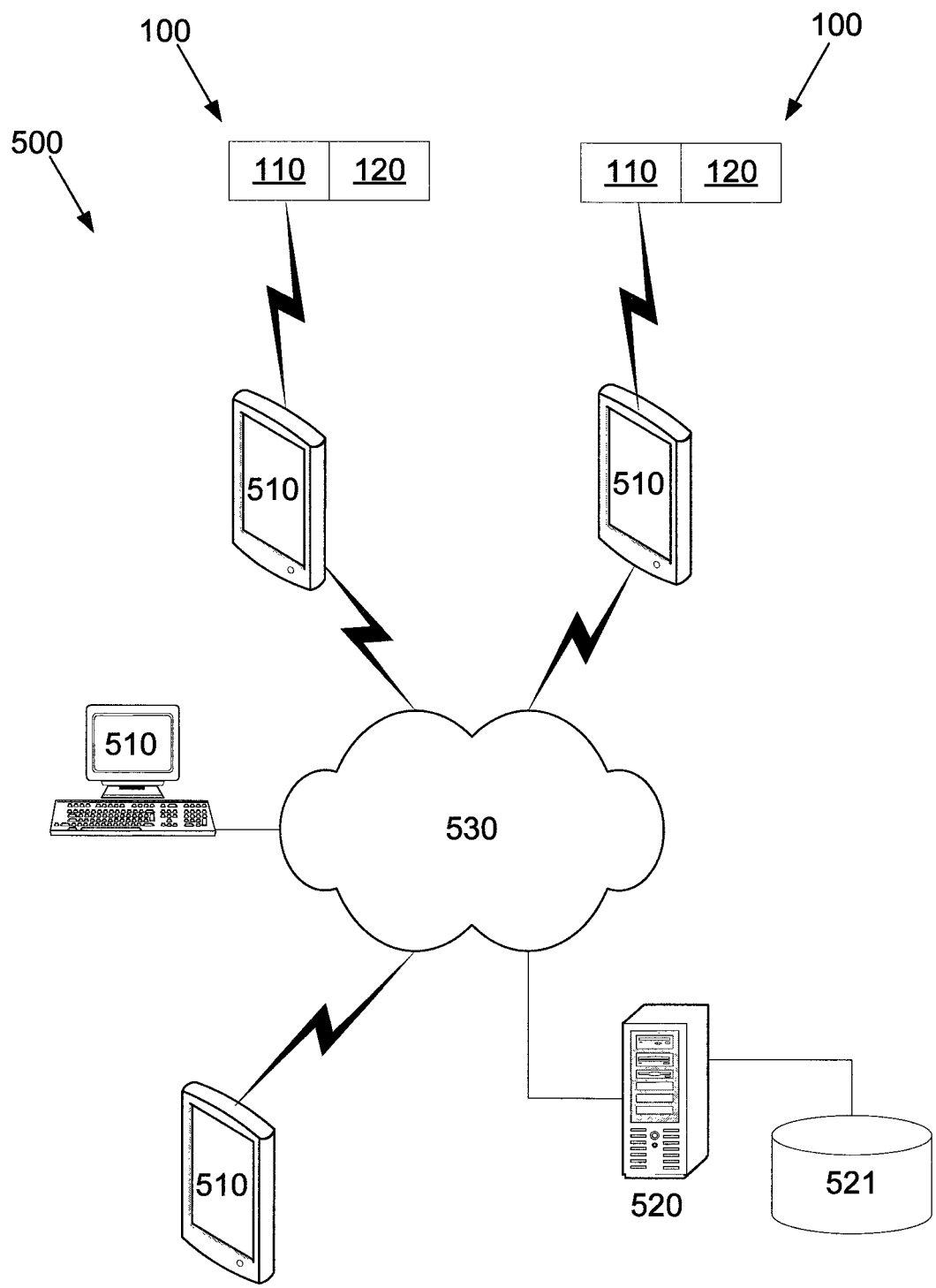
FIG. 5 is a schematic diagram of an example of a system for use in monitoring agricultural product quality.

The sensing devices 100 are typically used as a part of an overall system and an example of this will now be described with reference to FIG. 5.

In one example, the system includes one or more client devices 510, at least some of which are in communication with respective sensing devices 100. The client devices 510 are provided in communication with a remote server 520 and database 521, via one or more communications networks 530, such as the Internet, and/or a number of local area networks (LANs). It will be appreciated that in practice the server 520 and client devices 510 can communicate via any appropriate mechanism, such as via wired or wireless connections, including, but not limited to mobile networks, private networks, such as an 802.11 networks, the Internet, LANs, WANs, or the like, as well as via direct or point-to-point connections, such as Bluetooth, or the like.

In one example, the server 520 includes one or more processing systems, which may be coupled to one or more databases 521. The server 520 is adapted to be used in monitoring grain quality and interacting with the user via client devices 510. The client devices 510 are typically adapted to communicate with the server 520, allowing the user to interact with grain quality data, for example allowing this to be updated and/or displayed.

Whilst the server 520 is a shown as a single entity, it will be appreciated that the server 520 can be distributed over a number of geographically separate locations, for example by using multiple processing systems and/or databases that are provided as part of a cloud based environment. In one example, the remote data store is formed from a distributed data store and in one preferred example, is formed from a blockchain stored by multiple different processing systems. However, the above described arrangement is not essential and other suitable configurations could be used.

Figure 6:
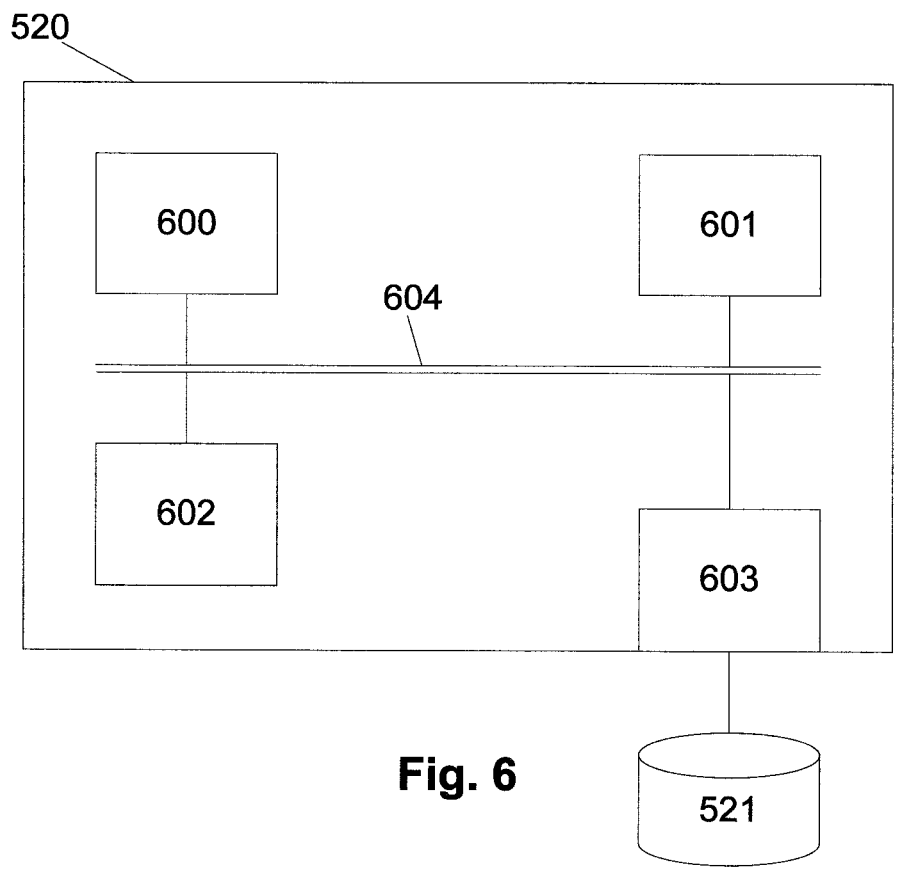
FIG. 6 is a schematic diagram of an example of a processing system of FIG. 5.

An example of a suitable server 520 is shown in FIG. 6. In this example, the server 520 includes at least one microprocessor 600, a memory 601, an optional input/output device 602, such as a keyboard and/or display, and an external interface 603, interconnected via a bus 604 as shown. In this example the external interface 603 can be utilised for connecting the server 520 to peripheral devices, such as the communications networks 530, databases 521, other storage devices, or the like. Although a single external interface 603 is shown, this is for the purpose of example only, and in practice multiple interfaces using various methods (eg. Ethernet, serial, USB, wireless or the like) may be provided.

In use, the microprocessor 600 executes instructions in the form of applications software stored in the memory 601 to allow the required processes to be performed. The applications software may include one or more software modules, and may be executed in a suitable execution environment, such as an operating system environment, or the like.

Accordingly, it will be appreciated that the server 520 may be formed from any suitable processing system, such as a suitably programmed client device, PC, web server, network server, or the like. In one particular example, the server 520 is a standard processing system such as an Intel Architecture based processing system, which executes software applications stored on non-volatile (e.g., hard disk) storage, although this is not essential. However, it will also be understood that the processing system could be any electronic processing device such as a microprocessor, microchip processor, logic gate configuration, firmware optionally associated with implementing logic such as an FPGA (Field Programmable Gate Array), or any other electronic device, system or arrangement.

Figure 7:
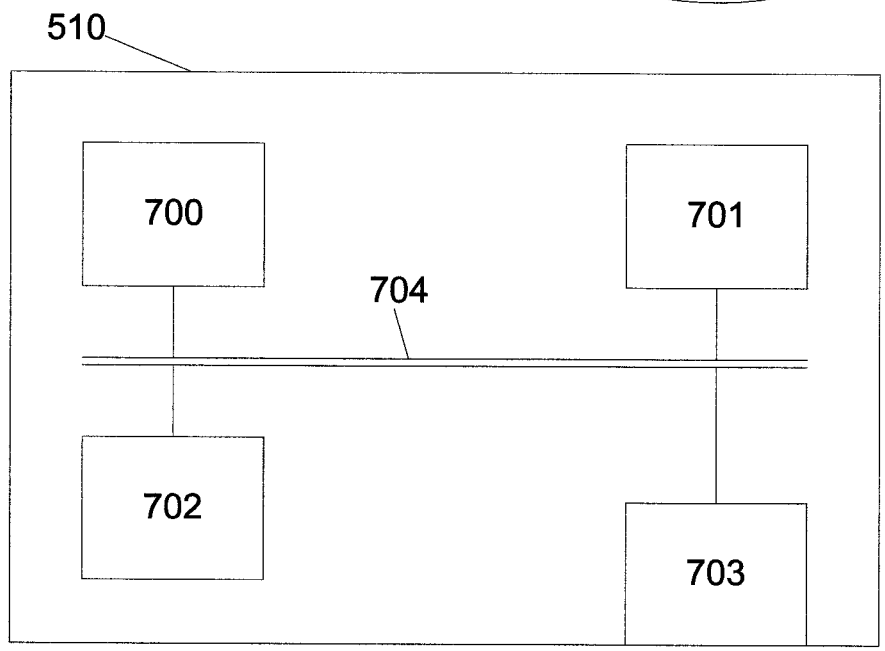
FIG. 7 is a schematic diagram of an example of a client device of FIG. 5.

As shown in FIG. 7, in one example, the client device 510 includes at least one microprocessor 600, a memory 601, an input/output device 602, such as a keyboard and/or display, and an external interface 603, interconnected via a bus 604 as shown. In this example the external interface 603 can be utilised for connecting the client device 510 to peripheral devices, such as the communications networks 530, databases, other storage devices, or the like, as well as to the sensing devices 100, and in particular the processing unit outputs 123, 333. Although a single external interface 603 is shown, this is for the purpose of example only, and in practice multiple interfaces using various methods (eg. Ethernet, serial, USB, wireless or the like) may be provided.

In use, the microprocessor 600 executes instructions in the form of applications software stored in the memory 601 to allow communication with the server 520, for example to allow for selection of parameter values and viewing of representations, or the like.

Accordingly, it will be appreciated that the client devices 510 may be formed from any suitable processing system, such as a suitably programmed PC, Internet terminal, laptop, or hand-held PC, and in one preferred example is either a tablet, or smart phone, or the like. Thus, in one example, the client device 510 is a standard processing system such as an Intel Architecture based processing system, which executes software applications stored on non-volatile (e.g., hard disk) storage, although this is not essential. However, it will also be understood that the client devices 510 can be any electronic processing device such as a microprocessor, microchip processor, logic gate configuration, firmware optionally associated with implementing logic such as an FPGA (Field Programmable Gate Array), or any other electronic device, system or arrangement.

Examples of the processes for grain quality monitoring will now be described in further detail. For the purpose of these examples it is assumed that the server 520 interacts with the client devices 510 via hosted webpages or an App residing on the client device 510. To achieve this the server 520 executes applications software for hosting webpages, as well as performing other required tasks including storing, searching and processing of data, with actions performed by the server 520 being performed by the processor 600 in accordance with instructions stored as applications software in the memory 601 and/or input commands received from a user via the I/O device 602 or the client device 510.

It will also be assumed that the user interacts with the server 520 via a GUI (Graphical User Interface), or the like presented on the client device 510, and in one particular example via a browser application that displays webpages hosted by the server 520, or an App that displays data supplied by the server 520. Actions performed by the client device 510 are performed by the processor 700 in accordance with instructions stored as applications software in the memory 701 and/or input commands received from a user via the I/O device 702.

However, it will be appreciated that the above described configuration assumed for the purpose of the following examples is not essential, and numerous other configurations may be used. It will also be appreciated that the partitioning of functionality between the client devices 510, and the server 520 may vary, depending on the particular implementation.

Figure 8:
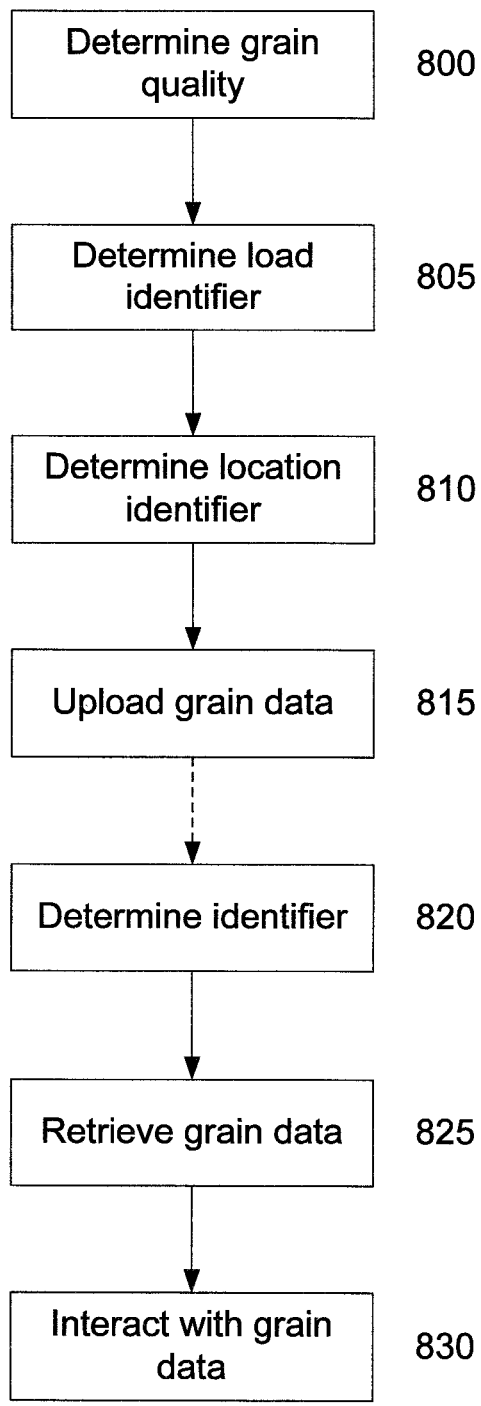
FIG. 8 is a flow chart of an example of a process for monitoring agricultural product quality using the system of FIG. 5.

An example of operation of the system 500 in order to allow the grain quality measured by the sensing device 100 to be stored in the database 521, so that this information can be subsequently retrieved as required, will now be described with reference to FIG. 8.

In this example, at step 800 the grain quality is determined by a client device 520. The grain quality is typically determined by having the client device receive the quality data from the sensing device 100, which at least in one example, is performed during a harvesting operation, although this is not essential, and alternatively, the quality data could be collected at an alternative time, such as when grain has been moved into a storage bin, or the like.

At step 805, a load identifier is determined. The load identifier is used to uniquely identify the particular load of grain and accordingly, in one example, is an identifier that is associated with a particular load of grain throughout the grain lifecycle, or until the load is combined with other loads, in which case a new load identifier could be assigned to the composite load. The load identifier could be of any suitable form, but in one example is an alphanumeric code. The load identifier could be determined in any suitable manner and for example could be generated and provided by the server 520 in response to a request by the client device 510, or could be generated automatically by the client device 510, using a predetermined algorithm. Alternatively, this could be manually assigned by a user.

At step 810, a location identifier is determined. The location identifier corresponds to a location in which the grain load is to be stored, and thus this is intended to change throughout the lifecycle of the grain, as the grain is moved between different storage locations, thereby allowing a current location of a load to be easily tracked. Thus, for example, the load identifier could initially be indicative of a harvester that harvests the grain, or a chaser bin or other similar receptacle into which grain is loaded from the harvester. However, downstream the location identifier could be indicative of a silo or other similar storage vessel, or a transport vehicle used to transport the grain to different locations. The identifier could be of any appropriate form, such as an alphanumeric code or the like, with each identifier typically being unique to a respective location within the supply chain. The location identifier could be determined in any suitable manner, and could be entered into the client device 510 manually by user, or alternatively could be sensed, for example by sensing an RFID tag or optically sensing machine readable coded data displayed on the storage location, or the like, for example using the identifier sensor 445.

Once the identifiers and quality data are determined, the client device 510 creates grain data incorporating the load identifier, the location identifier and the grain quality data, with this being uploaded to the server 520 and stored in the database 521 at step 815, allowing the grain data to be subsequently retrieved and used.

In one preferred example, grain data is stored as part of a blockchain, so that the grain data is stored in parallel in multiple different locations. In particular, the forms a continuously growing list of records, called blocks, which are linked and secured using cryptography, with each block being based on previous blocks, a timestamp and transaction data. This makes it difficult for the grain data to be subsequently altered thereby providing a mechanism to track providence of the grain. The blockchain is typically managed by a peer-to-peer network collectively adhering to a protocol for validating new blocks. Once recorded, the data in any given block cannot be altered retroactively without the alteration of all subsequent blocks, which requires collusion of the network majority.

When the grain data is to be retrieved, at step 820, a client device 510 can be used to determine an identifier, either in the form of a load identifier or a location identifier. For example, if a farmer wishes to retrieve information regarding a given load, the farmer could provide the load identifier, allowing the grain data to be retrieved. Alternatively, a location identifier could be provided, based on a known storage location, allowing the grain data of the grain stored therein to be retrieved.

The respective identifier can be provided to the server 520, allowing the server 520 to retrieve the grain data from the database 521, for example by identifying the grain data within the blockchain at step 825 and returned to the client device 510. Once retrieved, a representation of the grain data can be displayed to the user via the client device 510, allowing the user to interact with the grain data at step 830. For example, this can be used to allow the user to review information such as the grain quality, add additional information, such as information collected by sensors regarding storage conditions, or to update the grain data, for example to take into account movement of grain through the supply chain, as will be described in more detail below.

Accordingly, the above described system allows for tracking of grain to be performed by storing the grain data in a centralised and optionally distributed repository, which can then be accessed remotely by any suitably configured client device 510. This allows any individual anywhere within the supply chain to view information regarding the grain, including its current location and the grain quality. Additionally further information can be determined and associated with the grain data, allowing further benefits to be achieved, as will be described below.

Figure 9A:
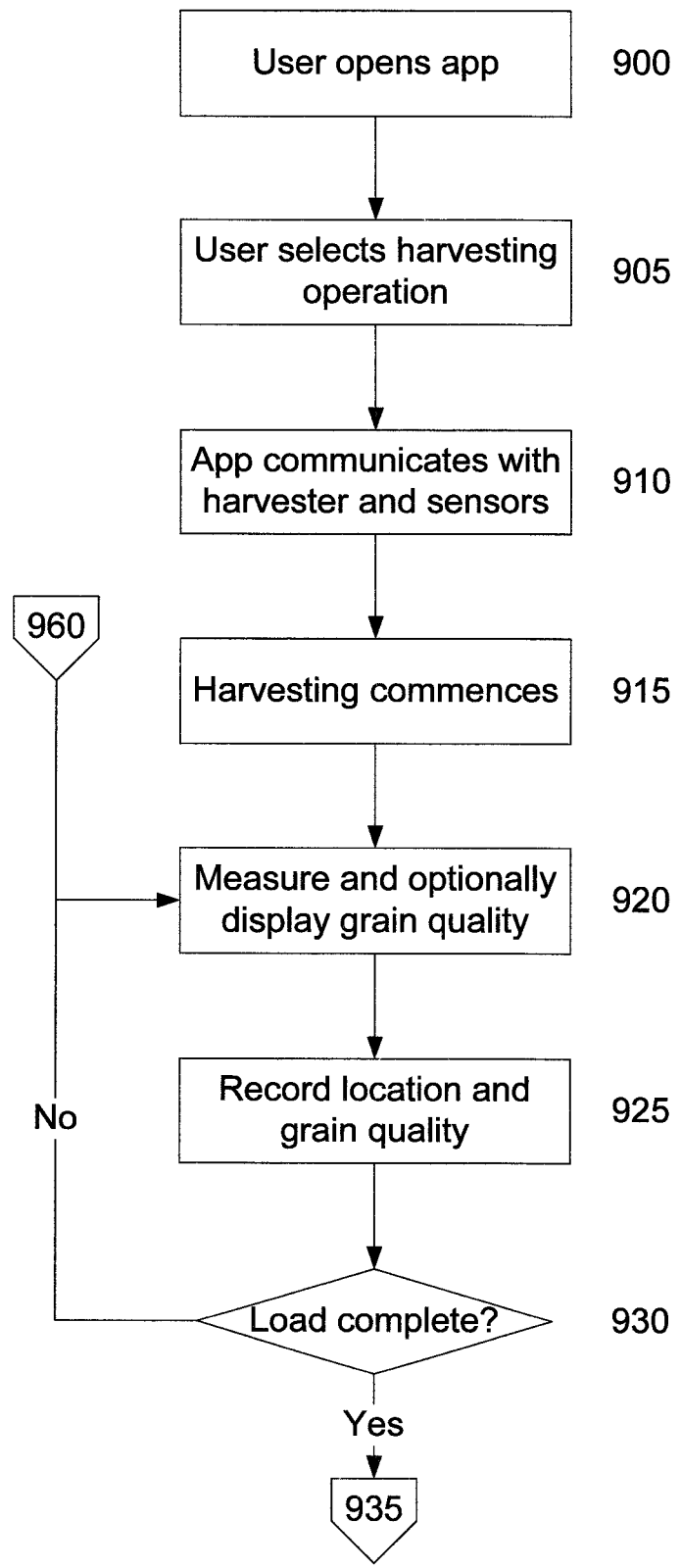
FIGS. 9A and 9B are a flow chart of an example of a specific example of a process for monitoring agricultural product quality during harvesting.
Figure 9B:
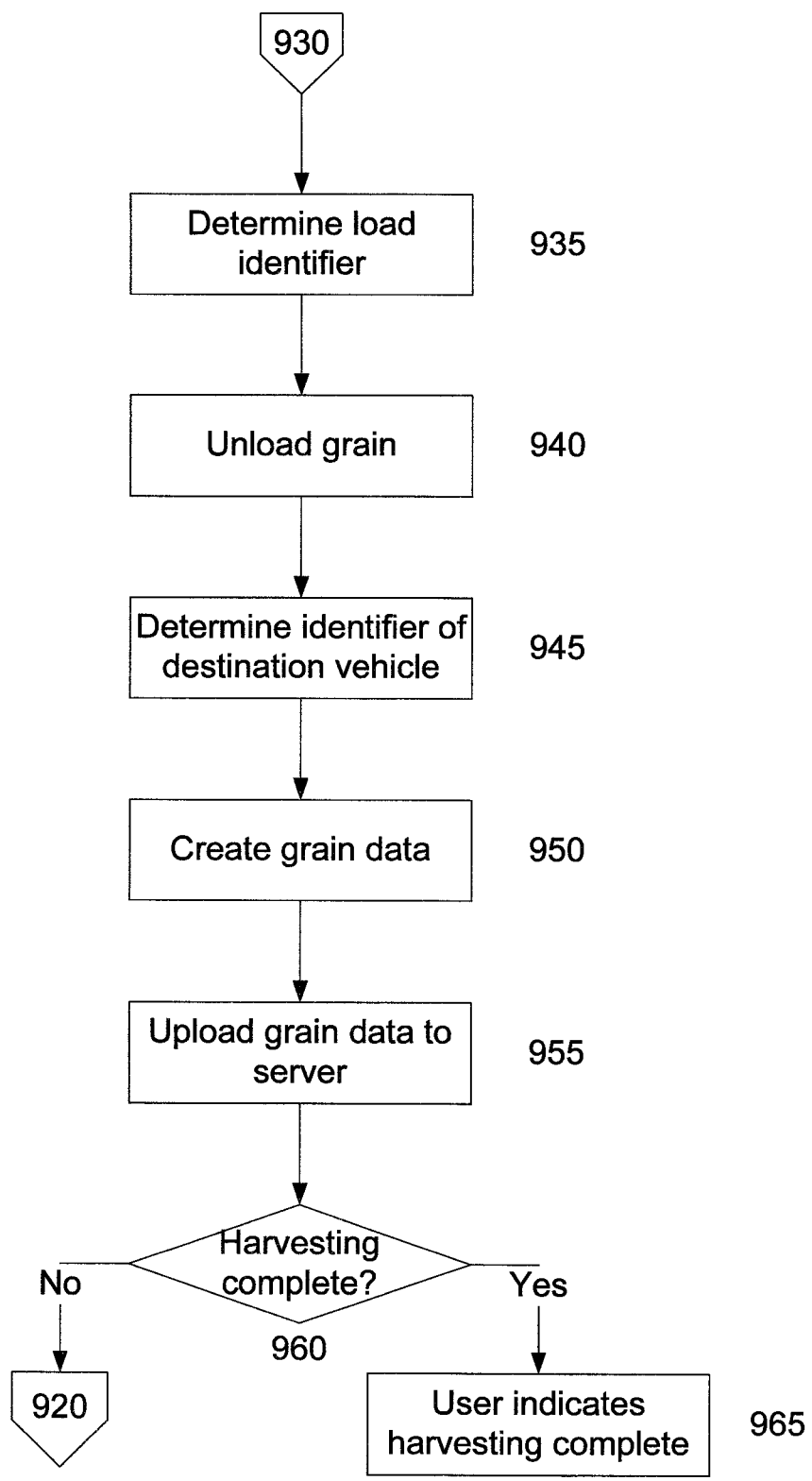

An example of this process will now be described with reference to FIGS. 9A and 9B.

In this example, the client device 510 is typically located in the cab of a harvester, with the sensing device 100 including a processing unit 110 also provided in the cab, and in communication with the client device 510. The sensing unit 420 is then mounted within the harvester grain transport system, allowing sensing of grain data to be performed, either as grain is harvested and stored in the on-board storage bin, or when grain is being transferred from the storage bin to a chaser vehicle.

At step 900, the user opens an app on the client device 510, with the app displaying a list of available options. The user selects a harvesting operation at step 905, causing the app to communicate with the harvester control system and any on-board sensors, such as a sensing device 100 and ancillary sensors, such as a GPS system or the like at step 910.

At step 915, harvesting commences, with the client device 510 determining this from the harvester control system, causing the client device 510 to communicate with the processing unit 110 to trigger measurement of grain quality at step 920. In particular, this causes the processing unit 110 to communicate with the sensing unit 120, causing the sensing unit 120 perform sensing as previously described, with sensor data being returned to the processing unit 110 for processing, and quality data being provided to the client device 510.

This can be performed using a bubble auger mounted sensing unit 120, similar to the arrangement shown in FIGS. 4A to 4D, which can be adapted to fit most harvester brands as they are all similar in this regard. This will typically connect to handheld processing unit 110 device provided in the harvester cabin, via wiring or a Bluetooth or other wireless connection, which in turn connects to the client device 510.

During this process, the client device 510 can show an indication of the quality data in real-time, for example in the form of a yield map, allowing an operator of the harvester to monitor grain quality during collection. This can be based solely on the current harvest, but in further examples can also be based on historical information from previous harvests, allowing the operator to predict where grain of different quality can be harvested, which can be used to allow the operator to control operations to optimise the quality of collected grain. For example, if there is a drop in quality during harvesting, the operator could cease collection of grain, or arrange for a new separate load to be collected, so as to not compromise the quality of a current load. As a further alternatively, monitoring the quality of grain on-board the harvester could allow grain to be diverted into different collection bins within or attached to the harvester, based on quality, thereby ensuring that high quality grain is not compromised by intermixing with lower quality grain.

At step 925, the location and grain quality, together with any other collected data, such as GPS coordinates of the harvester, and current ambient conditions, including temperature and humidity. This information can be used in assisting in understanding the conditions to which the grain has been exposed, as well as to allow mapping of grain quality throughout a harvesting area, which can assist in optimising the harvesting process in future.

At step 930, it is determined if a load is complete and if not, harvesting continues and the process returns to step 920, allowing further grain to be harvested and additional data to be collected. Otherwise, at step 935 a load identifier is determined by the client device 510, with this being generated automatically by the client device 510, or retrieved from the remote server 520 depending upon the preferred implementation.

At step 940 the grain is unloaded. It will be appreciated that in the current example, sensing of grain quality has already occurred at this point, but additionally and/or alternatively sensing of the grain quality could alternatively be performed during the unloading process, for example by having a sensing device mounted in the unload auger tube.

During unloading, an identifier of destination vehicle is determined at step 945. This can be achieved by having the operator of the harvester provide this information manually via an interface displayed on the client device 510. Alternatively, this could be performed automatically using the identifier sensor 445, which can be adapted to sense an RFID tag on the chaser vehicle, or the like, with the identifier sensor 445 forming part of the sensing unit provided in the unload auger tube, or a separate remote sensor coupled to the unload auger tube. As a further alternative, a driver of the vehicle could use their own client device to display an identifier indicative of the vehicle, which is then sensed by the client device of the harvester driver, allowing a location identifier to be exchanged between devices of the vehicle and harvester drivers, or custodian to custodian (truck to truck).

Grain data is created at step 950, with the grain data including the grain quality data obtained from the processing unit 110, as well as the location and load identifier, and any other data collected during the harvesting process, including for an example an identity of the operator of the harvester. The grain data is then uploaded to the server 520 at step 955, and in one example stored as part of a blockchain, which acts as a distributed ledger to record transactions between two parties in a verifiable and permanent way.

Following this, it is determined if harvesting is complete at step 960, and if not the process returns to step 920, allowing further loads to be harvested and processed in a similar manner. Otherwise the user can confirm the harvesting process is complete via a suitable option displayed on the client device.

Accordingly, in the above described process, grain data is created during harvesting in which case the client device can determine one or more harvesting conditions and generate grain data in accordance with the harvesting conditions, which can include a harvesting location, a harvesting time or date and ambient conditions or other relevant information. In one example, the client device determines the harvesting conditions at least in part by communicating with the control system of a harvester. Thus, the client device can interface with harvester controls and use these to discern information such as the location of the harvester during harvesting. However, this is not essential and alternatively this could be performed using inbuilt sensors or the like.

Figure 10:
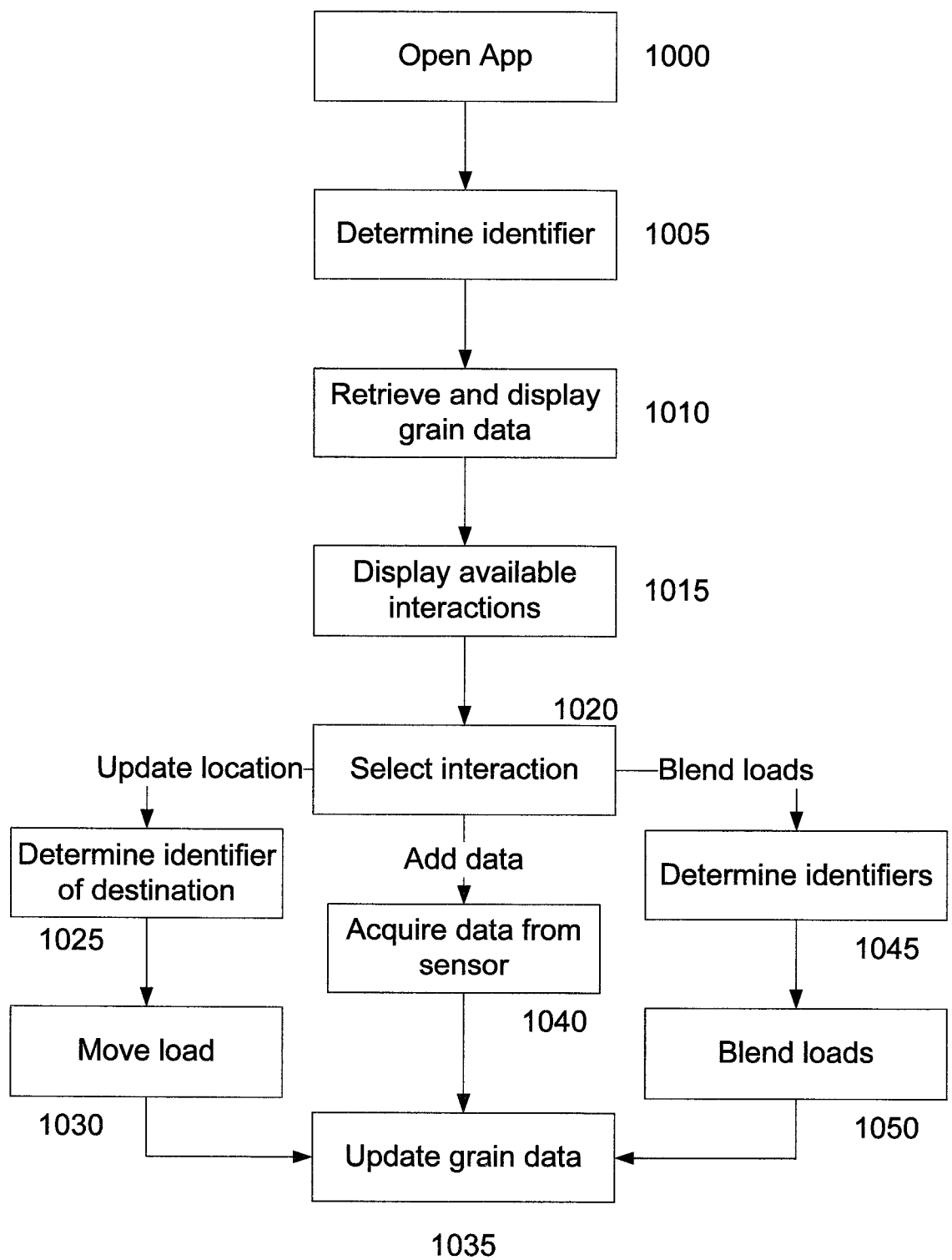
FIG. 10 is a flow chart of an example of a process for ongoing interaction with the agricultural product data generated using the process of FIGS. 9A and 9B; and, FIG. 11 is a flow chart of an example of a agricultural product lifecycle.

Once the grain data has been created, further interactions can be performed, such as modifying the grain data to change the storage location, combining the grain data associated with multiple loads to reflect blending of the loads, or adding sensor data to the grain data, the sensor data being obtained from more additional sensors, such as sensors that sense ambient environmental conditions to which the grain is subject. This data can be added to the blockchain in a similar manner. An example of this process will now be described with reference to FIG. 10.

In this example, the further interactions are performed using other client devices 510 and accordingly at step 1000, the user opens an app. The user then operates to access relevant grain data by determining an identifier, including either or both of the location identifier or load identifier. For example, if the user wants information regarding a specific load, they can manually enter the load identifier. More typically however the user will require information regarding grain in a current storage or transport location, in which case the user can either manually enter, or sense the location identifier at step 1005. Thus, for example, a user could scan a location identifier tag mounted on a storage vessel, such as a silo, allowing this to be used to retrieve and display grain data regarding the grain contained therein at step 1010.

Alternatively, the load identifier could be presented in a client device associated with an individual currently in possession of the grain. For example, if a truck driver with a load is transferring the load to another party (e.g a grain mill who has purchased the grain) the truck driver could present a QR code generated and displayed on their client device to the mill operative, allowing the mill operative to simply scan the QR code and determine the location identifier. However, other arrangements could be used to transfer identifiers between client devices 510, including but not limited to wireless protocols, such as IR, Bluetooth, or the like, thereby allowing identifiers to be exchanged between client device 510 to thereby provide a mechanism to facilitate tracking of grain as it is moved through the supply chain.

Once the grain data has been retrieved and displayed, details of available interactions can be displayed to the user at step 1015, allowing the user to select an interaction at step 1020. A range of different interactions can be accommodated by the system, and examples of these in the form of updating the location, adding additional data and blending loads will now be described, although it will be appreciated that these are not intended to be limiting.

For example, a user may select to update a location of the grain if the grain is being transferred between storage vessels, transport vehicles, or the like. In this instance, the user can determine the location identifier of the destination location at step 1025, for example by sensing a respective RFID tag, manually entering the information, or the like. The load is then moved at step 1030, with the grain data being updated at step 1040 by adding the new location identifier, effectively adding the transaction to the blockchain. In this regard, the location identifier of the destination location could simply replace the existing location identifier, but more typically the new location identifier is added, together with an indication of the time and date on which the transfer is made, allowing movement of the grain between storage vessels to be subsequently tracked. This is useful for auditing purposes, and to ensure loads of grain are not inadvertently mixed up. During this process, additional quality data could also be sensed, in order to ensure the quality of the load has not altered.

It will be appreciated from this that movement of the grain through a supply chain can be tracked, with each successive individual responsible for the grain updating the grain data as it is being transited through the supply chain. To facilitate this, vehicles could include on-board computing devices functioning as client devices 510, allowing the interaction performed during transfer of loads to be substantially automated through exchange of identifiers between computer systems.

If additional data is being added, data is acquired from additional sensors at step 1040, for example by having the client device 510 interface with additional sensors, such as temperature or humidity sensors within a storage vessel, or the like. At step 1035, the grain data is again updated to add the new data, with this again being time and/or date stamped. It will be appreciated that this can be performed to ensure the grain is maintained in desired or optimal conditions throughout the grain lifecycle.

As part of this, in addition to simply recording the location of a load of grain, the system can also perform more refined tracking, for example to distinguish between loads of grain within a single storage vessel. In this regard, multiple loads of grain would typically be stored in a single storage silo. In this case, grain typically enters the silo sequentially in a controlled process, with the grain being removed on a last in first out basis, by virtue of loading and unloading being performed at the top of the silo. Accordingly, by taking into account the volume of grain loading into and extracted from the silo, this can be used to ensure grain loads are uniquely tracked, even in the event that multiple loads are contained within a single storage vessel.

Alternatively, the user could select to blend multiple loads, for example to increase the average quality of a poor quality load by mixing this with higher quality grain. In this instance, the identifiers of each of the loads and a new destination location is determined at step 1045, in a similar manner to that previously described, with the loads being blended at step 1050 and the grain being updated at step 1035. In this regard, blending could be controlled by the system, for example by having the server 520 and/or client device 510 calculate loads that should be blended to maximise quality and/or returns on the blending process. It will be appreciated that this could be based on defined algorithms, and could also take into account data regarding grain availability, such as current prices associated with respective quality of grain. The system may also be able to track weights of grain, for example by having the mountable sensing device 400 calculate tonnage amounts based on the volume and/or density of grain flowing therethrough, or by having the system receiving weight data from an external weight sensing apparatus, which could in turn be used by the algorithm to enhance blending calculations.

Accordingly, it will be appreciated that this provides a mechanism to allow grain data to be maintained as the grain moves throughout a lifecycle from harvesting to the end consumer. Furthermore, by storing the data centrally, and optionally in a distributed blockchain, and recording ancillary data such as time stamps and ambient conditions, this can allow auditing of the grain supply process to be performed, to help ensure grain quality requirements are met.

Figure 11:
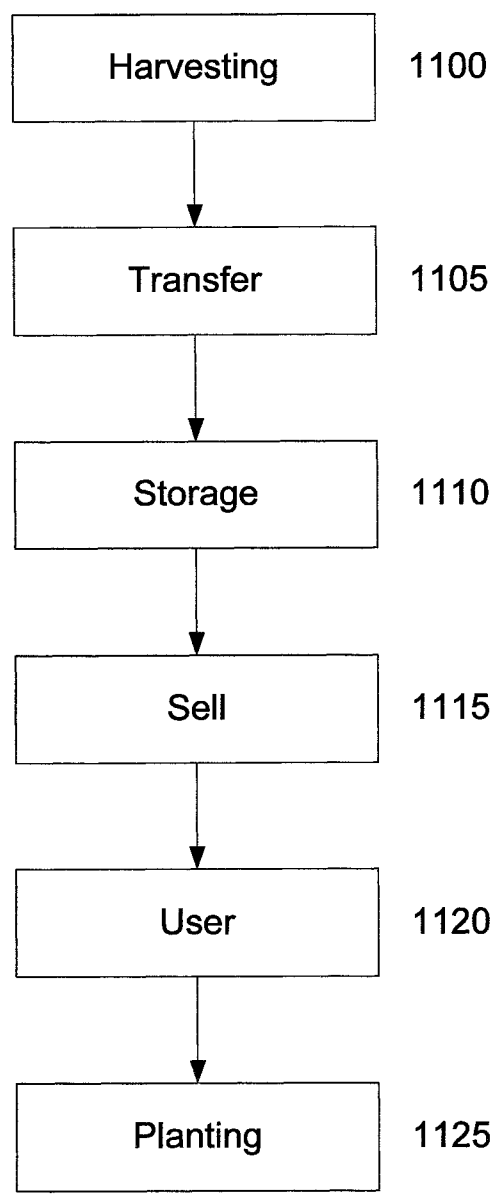

An example of this will now be described with reference to FIG. 11.

In this example, at step 1100, grain is initially harvested. This is typically performed using a computer driven combine harvester, with harvesting being directed by on protein levels within the respective paddock, for example as determined based on quality information from previous harvests. To achieve this, during harvesting the sensing unit 420, via the processing unit 110, links to a client device 510 device in the harvester cabin. When protein harvesting, farmers can use information provided by the client device 510 to harvest the field in sections, depending on the protein level. This means that farmers can segregate their grain as they harvest, with the sensing system creating a map of the protein levels in each field. Once the harvester is full, or a respective section completed, the client device 510 collates the data specific to that particular load stores this directly to the database 521, and in particular the blockchain, via the server 520. The end result will be that the grower has segregated all their grain and has a clear trace of each and every load harvested and where it was sent or stored.

This grain data can then be accessed, optionally from the blockchain, by the next custodian of the load, by downloading the grain data from the server, based on either the load and/or location identifier. Thus, in the current example, at step 1105, the driver of the chaser truck or tractor towed bin will be able to immediately view the grain data, allowing them to take this into account when transporting the load to its next destination. For example, this can allow the driver to select an appropriate storage vessel depending on the quality of the load, allowing the grain to be stored at step 1110. Such storage could be in any suitable form of storage, such as silo bags, large scale flat bottom silos, cone silos, or the like, each of which can be provided with their own respective identifier, and with the operator assigning the load to a respective store based on the measured protein levels.

While stored ongoing monitoring can be performed using the handheld sensing device, including the processing unit 110 and the sensing unit 120. In particular, operators are able to readily identify the relevant grain based on the location identifier of the storage vessel, and then check and update grain quality based on ongoing measurements. Additional information regarding storage conditions can also be logged and added to the grain data.

Whilst stored or during the storage process, additional actions might be performed, such as blending of different loads to maximise load values, and minimise storage requirements, as will be appreciated by persons skilled in the art. This process can be managed using the grain data to assess which loads should be blended, and also to link, associate or consolidate grain data of blended loads. This can be performed by bulk handlers, which are private storage systems that use their size and quantity levels, to mix grain to ensure they optimise the resulting mix to quality requirements.

At this point in the lifecycle, the grain is typically sold to respective buyers, who can use the grain data in order to ensure the grain they are purchasing meets their requirements. In this regard, protein levels are one of the main factors affecting the grade of the commodity, and accordingly, the system can be configured to allow buyers access to grain data from a range of different suppliers. This allows buyers to use the system as an online trading platform, to accumulate the required grain from accredited users.

Purchased grain is then on-sold to end users at step 1120, which again can be performed using similar techniques, allowing users to identify particular loads of grain meeting their requirements, confident that the grain will have the requisite quality and that the grain has been transported and stored in appropriate manners.

Finally, farmers are able to use data collected from previous harvests when planting new crop, ensuring that the crop is appropriately distributed and controlling fertiliser levels and other variables in order to ensure that yields and quality are maximised.

Accordingly, the above described arrangements provides a sensing device and associated system that allow grain quality to be monitored in a wide range of circumstances, with resulting grain quality data being stored centrally, allowing this to be accessed by a range of stakeholders.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers.

Persons skilled in the art will appreciate that numerous variations and modifications will become apparent. All such variations and modifications which become apparent to persons skilled in the art, should be considered to fall within the spirit and scope that the invention broadly appearing before described.

The claims defining the invention are as follows:

1. A system for monitoring agricultural product quality, wherein the system includes a client device that:
    a) receives, from a sensing device, an indication of quality data at least partially indicative of an agricultural product quality of an agricultural product load;
    b) determines a load identifier indicative of the agricultural product load;
    c) determines a location identifier indicative of a storage location of the agricultural product load;
    d) generates agricultural product data indicative of:
        i) the load identifier;
        ii) the agricultural product quality; and,
        iii) the storage location; and,
    e) transfers the agricultural product data to a remote data store via a communications network, f) uses at least one of the load identifier and the location identifier to retrieve agricultural product data from the remote data store; and,
g) at least one of:
   i) displays a representation of at least part of the agricultural product data;
   ii) performs at least one interaction in accordance with user input commands; wherein the at least one interaction includes at least one of:
      (1) modifying the agricultural product data to change a storage location;
      (2) combining the agricultural product data associated with multiple loads to reflect blending of the loads; and,
      (3) adding sensor data to the agricultural product data, the sensor data being obtained from one or more additional sensors.

2. A system according to claim 1, wherein the agricultural product data is created during harvesting, and wherein the client device:
   a) determines one or more harvesting conditions; and,
   b) generates the agricultural product data in accordance with the harvesting conditions.

3. A system according to claim 2, wherein the harvesting conditions include at least one of:
   a) a harvesting location;
   b) a harvesting time or date; and,
   c) ambient conditions.

4. A system according to claim 2, wherein the client device determines the harvesting conditions at least in part by communicating with a control system of a harvester.

5. A system according to claim 1, wherein the client device:
   a) determines a location identifier of a new storage location; and,
   b) modifies the agricultural product data by adding the location identifier of the new storage location.

6. A system according to claim 1, wherein the additional sensors including one or more conditions sensors that sense ambient conditions to which the agricultural product is subject.

7. A system according to claim 1, wherein the client device determines a location identifier using at least one of:
   a) input commands from a user; and,
   b) signals received from a location identifier sensor, the location identifier sensor being adapted to sense coded data indicative of the location identifier.

8. A system according to claim 7, wherein the coded data is at least one of:
   a) stored on an RFID tag; and,
   b) displayed optical coded data.

9. A system according to claim 1, wherein the system:
   a) creates agricultural product data during harvesting;
   b) stores the agricultural product data in a data store accessible via a communications network; and,
   c) uses one or more client devices to access the agricultural product data via the communications network, thereby allowing interaction with the agricultural product data as the agricultural product is moved through a supply chain.

10. A system according to claim 9, wherein agricultural product data is modified in order to reflect a status of the agricultural product throughout the supply chain for auditing purposes.

11. A system according to claim 1, wherein the remote data store is at least one of:
   a) a distributed data store; and,
   b) a blockchain.

12. A system according to claim 1, wherein the client device receives the indication of the quality data from a sensing device.

13. A system according to claim 1, wherein the sensing device includes:
   a) a sensing unit including:
      i) a sensing unit housing defining a sensing region, at least part of a load of agricultural product being positioned within the sensing region to allow sensing of agricultural product quality to be performed;
      ii) a radiation source that generates radiation, the radiation being emitted into the sensing region;
      iii) a sensor that senses radiation emitted from the sensing region;
      iv) a sensing unit processor coupled to the radiation source and the sensor that:
         (1) controls the radiation source;
         (2) receives signals from the sensor indicative of sensed radiation; and,
         (3) generates a sensed radiation data indicative of at least the sensed radiation;
      v) a sensing unit output coupled to the sensing unit processor that outputs an indication of the sensed radiation data; and,
   b) a processing unit including:
      i) a processing unit housing;
      ii) a processing unit input that receives the indication of the sensed radiation from the sensing unit output;
      iii) an electronic processing device that:
         (1) processes the sensed radiation data; and,
         (2) generates quality data at least partially indicative of agricultural product quality using the sensed radiation data; and,
      iv) a processing unit output coupled to the processing device that outputs an indication of the quality data.

* * * * *